(12) United States Patent  
Su

(10) Patent No.: US 9,539,592 B2  
(45) Date of Patent: Jan. 10, 2017

(54) ADJUSTMENT DEVICE FOR OSCILLATING SPRINKLER

(71) Applicant: Ho-Chin Chen, Taichung (TW)

(72) Inventor: Shian Chun Su, Taichung (TW)

(73) Assignee: Ho-Chen Chen, Taichung (TW)

( * ) Notice: Subject to any disclaimer, the term of this patent is extended or adjusted under 35 U.S.C. 154(b) by 64 days.

(21) Appl. No.: 14/730,508

(22) Filed: Jun. 4, 2015

(65) Prior Publication Data

US 2016/0354792 A1 Dec. 8, 2016

(51) Int. Cl.
*B05B 3/00* (2006.01)
*B05B 3/04* (2006.01)
*B05B 1/20* (2006.01)
*B05B 1/00* (2006.01)
*B05B 3/14* (2006.01)
*A01G 25/16* (2006.01)

(52) U.S. Cl.
CPC .................. *B05B 3/14* (2013.01); *A01G 25/16* (2013.01)

(58) Field of Classification Search
CPC ................ B05B 3/14; B05B 3/02; B05B 1/20; B05B 1/30; B05B 3/044; B05B 3/0422; B05B 3/12; A01G 25/16
USPC ............... 239/264, 242, 227, 240, 247, 248, 455,239/546, 566, 568, 602, DIG. 1, DIG. 12
See application file for complete search history.

(56) References Cited

U.S. PATENT DOCUMENTS

| | | | | |
|---|---|---|---|---|
| 3,212,719 A * | 10/1965 | Di Corpo | ................. | A62C 2/08 239/541 |
| 5,305,956 A * | 4/1994 | Wang | ................... | B05B 1/1645 239/242 |
| 5,562,247 A * | 10/1996 | Roman | ................... | B05B 3/044 239/240 |
| 5,657,928 A * | 8/1997 | Jian | ....................... | B05B 1/3026 239/242 |
| 5,845,850 A * | 12/1998 | Guo | ........................ | B05B 3/044 239/242 |
| 6,135,356 A * | 10/2000 | Mitzlaff | ............... | B05B 15/066 239/1 |
| 6,736,340 B1 * | 5/2004 | Wang | ...................... | A62C 2/08 239/242 |
| 7,258,286 B1 * | 8/2007 | Wang | ...................... | A62C 2/08 239/240 |
| 7,284,714 B1 * | 10/2007 | Wang | ................... | B05B 1/1663 239/240 |
| 7,389,950 B2 * | 6/2008 | Lo | .......................... | B05B 3/044 239/201 |

(Continued)

*Primary Examiner* — Darren W Gorman  
*Assistant Examiner* — Steven M Cernoch  
(74) *Attorney, Agent, or Firm* — Bacon & Thomas, PLLC

(57) ABSTRACT

An oscillating sprinkler includes a hollow tube having a groove defined axially therein so as to receive a nozzle unit therein. The nozzle unit has flexible nozzles which extend through holes in the inner bottom of the groove. The hollow tube has first paths and second paths defined radially in the outside thereof. The distance between any two adjacent first paths is smaller than the distance between any two of the adjacent second paths. A resilient wire is formed with continuous S-shaped portions, and each S-shaped portion has two adjustment slots opening toward opposite directions. The nozzles are movable in the adjustment slots. The hollow tube is received between a top member and a bottom member. The resilient wire is moved with the movement of the top member. The nozzles are pulled and pushed by the S-shaped portions to have different patterns of sprinkling.

6 Claims, 13 Drawing Sheets

(56) References Cited

U.S. PATENT DOCUMENTS

| | | | | |
|---|---|---|---|---|
| 7,607,590 | B2* | 10/2009 | Nies | B05B 15/066 239/242 |
| 7,909,266 | B2* | 3/2011 | Lo | B05B 3/044 239/240 |
| 8,011,602 | B2* | 9/2011 | Coppersmith | B05B 3/044 239/11 |
| 8,534,573 | B2* | 9/2013 | Wang | B05B 15/066 239/227 |
| 8,567,692 | B2* | 10/2013 | Coppersmith | B05B 3/044 239/11 |
| 2006/0032949 | A1* | 2/2006 | Lo | B05B 3/044 239/542 |
| 2007/0221756 | A1* | 9/2007 | Wang | B05B 1/1654 239/390 |
| 2009/0200391 | A1* | 8/2009 | Yehuda | A01C 23/042 239/10 |
| 2011/0101123 | A1* | 5/2011 | Coppersmith | B05B 3/044 239/11 |

* cited by examiner

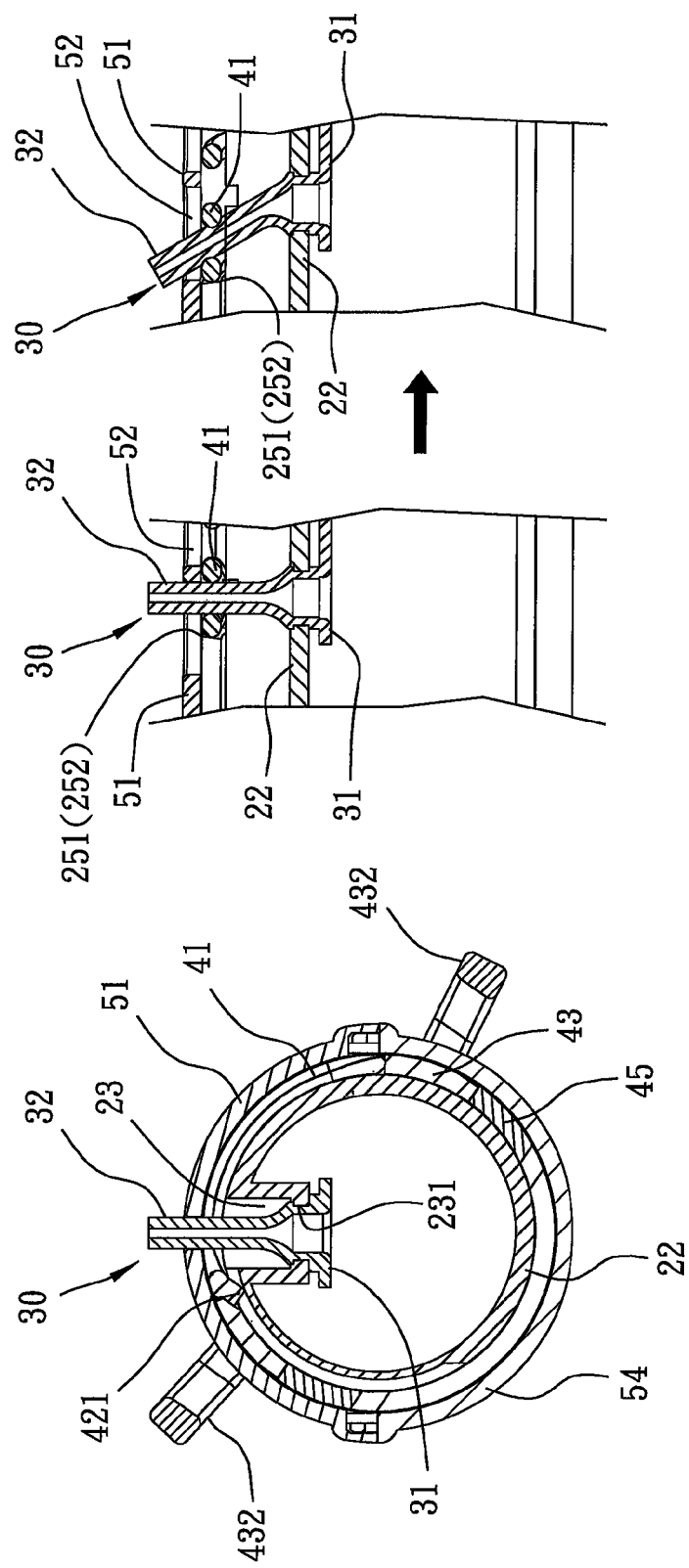

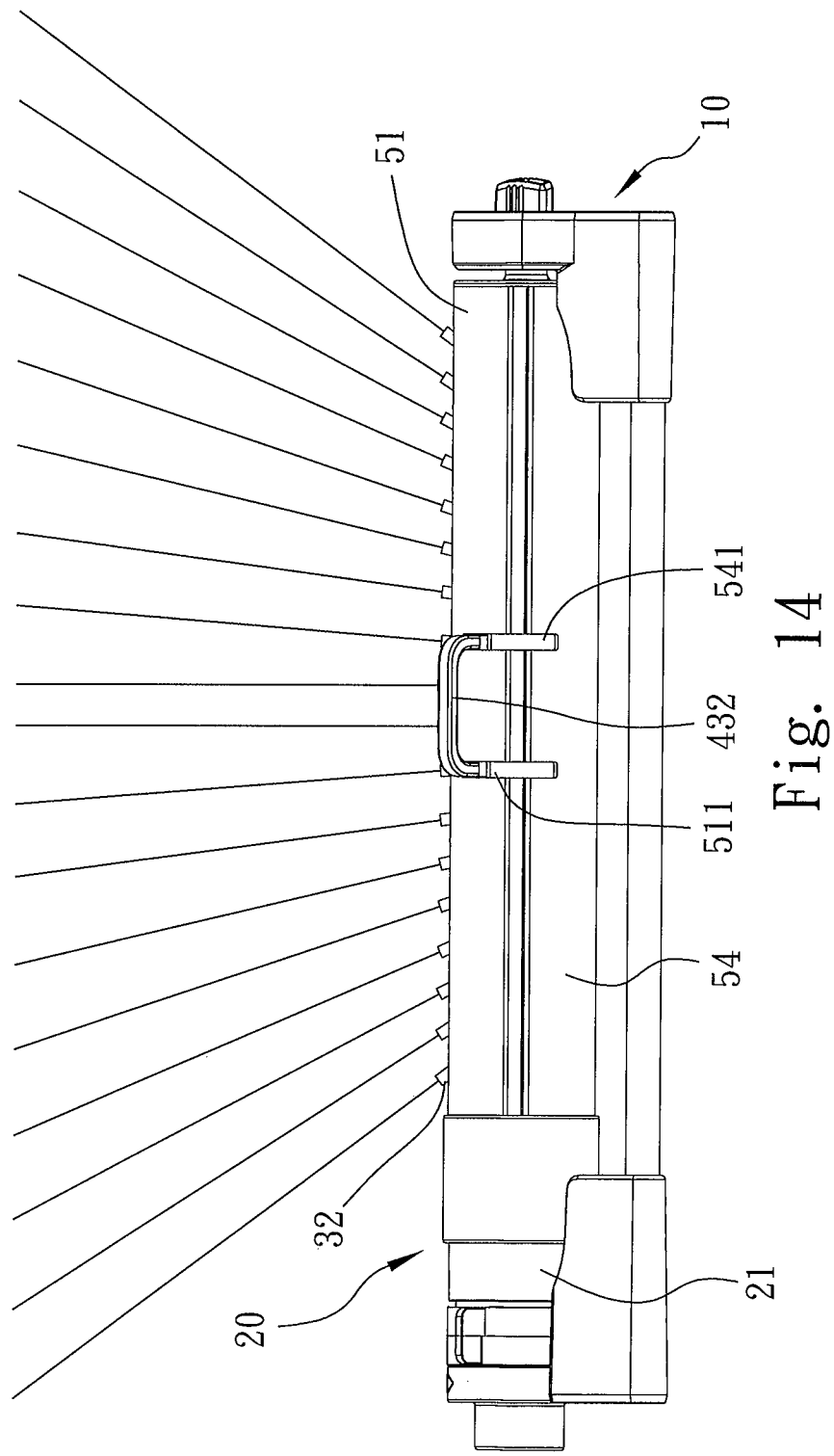

ADJUSTMENT DEVICE FOR OSCILLATING SPRINKLER

BACKGROUND OF THE INVENTION

1. Fields of the Invention

The present invention relates to an oscillating sprinkler, and more particularly, to an adjustment device for adjusting angles of the nozzles of the oscillating sprinkler.

2. Descriptions of Related Art

The conventional oscillating sprinkler with a driving device is disclosed in Taiwan Utility Model M269972 which includes a driving device connected to the hollow and cylindrical housing of the sprinkler, the housing includes multiple holes. Each hole has a nozzle received therein. A curved plate is mounted to the nozzles and has multiple inclined notches which extend toward different directions. The nozzles are received in the notches and the outlet of each nozzle protrudes beyond the curved plate. A cover is mounted to the driving device and has apertures which are located corresponding to the outlets of the nozzles. When the curved plate moves back and forth, the angle that the outlet directed is adjusted to as to obtain different patterns of sprinkling.

However, the curved plate is a thin and elongate plate, such that the machining processes are complicated and difficult to make the notches at even distance, and the insides of each notch have to be smooth to allow the nozzle to move smoothly. The curved plate tends to be deformed during manufacturing and this affects the notches and the movement of the nozzles.

U.S. Pat. No. 7,607,590 B2 is filed after the publish date of the Taiwan Utility Model M269972, and discloses a curved plate on the axes of the nozzles. The curved plate has multiple notches which have specific shapes and are located at specific distances relative to each other. By the curved plate, the sprinkler can have different patterns of sprinkling. Nevertheless, the curved plate has the same problem as described in the Taiwan Utility Model M269972. Therefore, there is a need for improvement of the curved plate.

The present invention intends to provide an adjustment device for adjusting angles of the nozzles of the oscillating sprinkler, and the adjustment device eliminates the shortcomings mentioned above.

SUMMARY OF THE INVENTION

The present invention relates to an oscillating sprinkler and comprises a base, an oscillating nit and a nozzle unit, wherein the oscillating unit is a hollow tube and connected between two ends of the bases. The hollow tube has a groove defined axially in the outside thereof, and the nozzle unit is located in the groove and has multiple flexible nozzles. Multiple holes are defined through the inner bottom of the groove and located corresponding to the nozzles. The holes communicate with the interior of the hollow tube. The nozzles extend through the holes respectively. The hollow tube has first paths and second paths defined radially in the outside thereof. The distance between any two adjacent first paths is smaller than the distance between any two adjacent second paths.

A driving unit has a resilient wire, a top member and a bottom member. The top member has an opening which is defined by two long sides and two short sides. Each of the two long sides has multiple notches defined in the inside thereof. The hollow tube is located between the top member and the bottom member. The resilient wire has a round cross section and is bent into continuous S-shaped portions. Each S-shaped portion has two adjustment slots which are curved slots and open toward opposite directions. Each adjustment slot is defined by an end portion and two extensions which extend from two ends of the end portion. The resilient wire is located in the opening of the top member, and the end portions are engaged with the notches of the top member. The end portions are movably located in the combination paths. The nozzles are located in the adjustment slots respectively.

The end portions of the S-shaped portions of the resilient wire are guided and smoothly moved along the first and second paths by moving the top member so that the nozzles are pivoted an angle.

The resilient wire has a round cross section and the end portions of the resilient wire are moved along the first and second paths, the nozzles can be effectively guided to change the sprinkling areas.

The groove is located between the first paths and the second paths. When the top member is moved, the end portions of the resilient wire are moved in the first and second paths. Because the distance between any two adjacent first paths is smaller than the distance between any two adjacent second paths, so that when the end portions in the first paths are moved toward the groove, the angle of the nozzles that is pivoted is smaller than an angle of the nozzles when the end portions in the second paths are moved toward the groove.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 7 is a cross sectional view to show the driving unit, the tube and the nozzles of the oscillating sprinkler of the present invention;

FIG. 8 shows the nozzle is inclined by the resilient wire;

FIG. 14 shows a front view to show the third sprinkling type.

DETAILED DESCRIPTION OF THE PREFERRED EMBODIMENT

Figure 1:
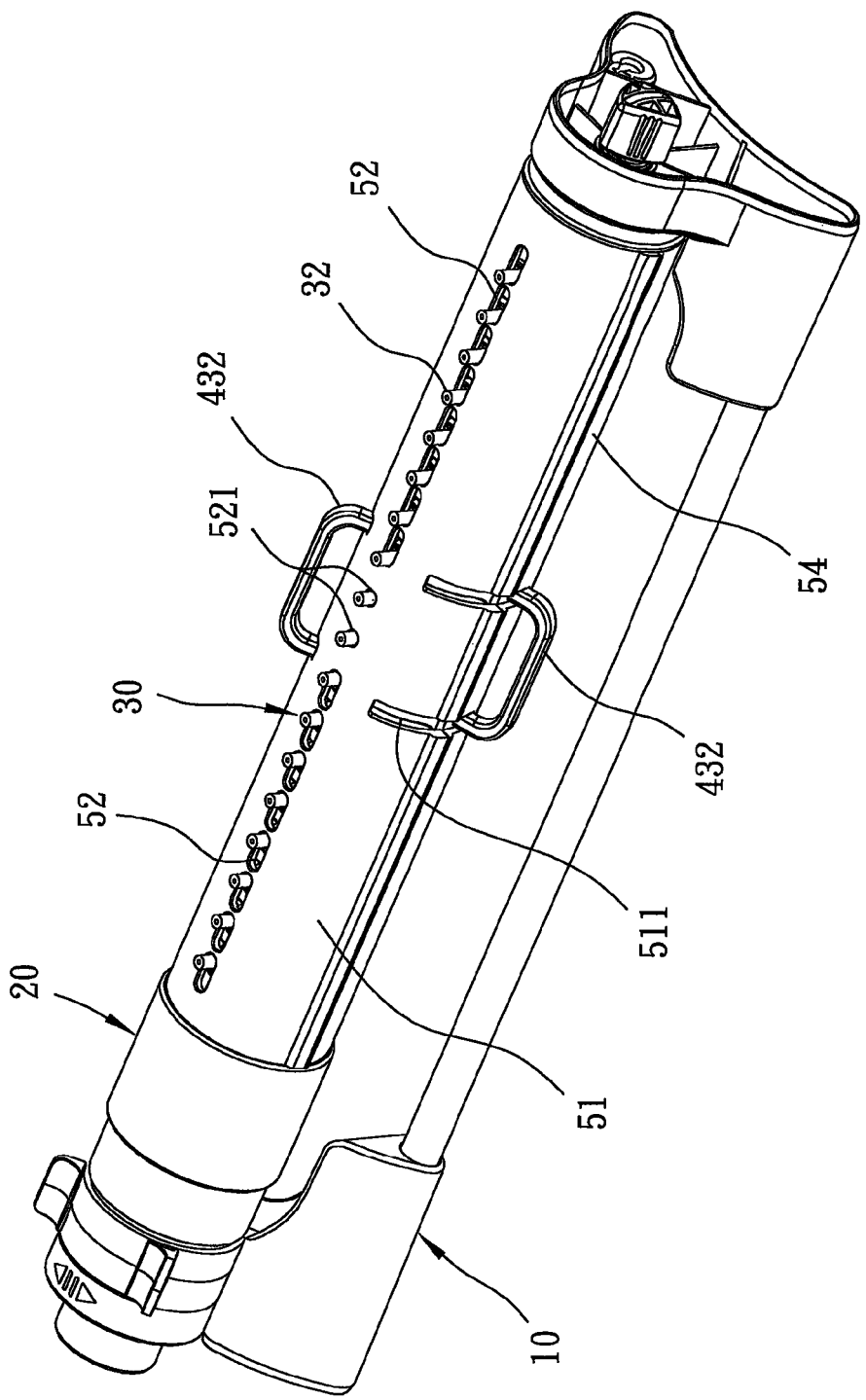
FIG. 1 is a perspective view to show the oscillating sprinkler of the present invention.
Figure 2:
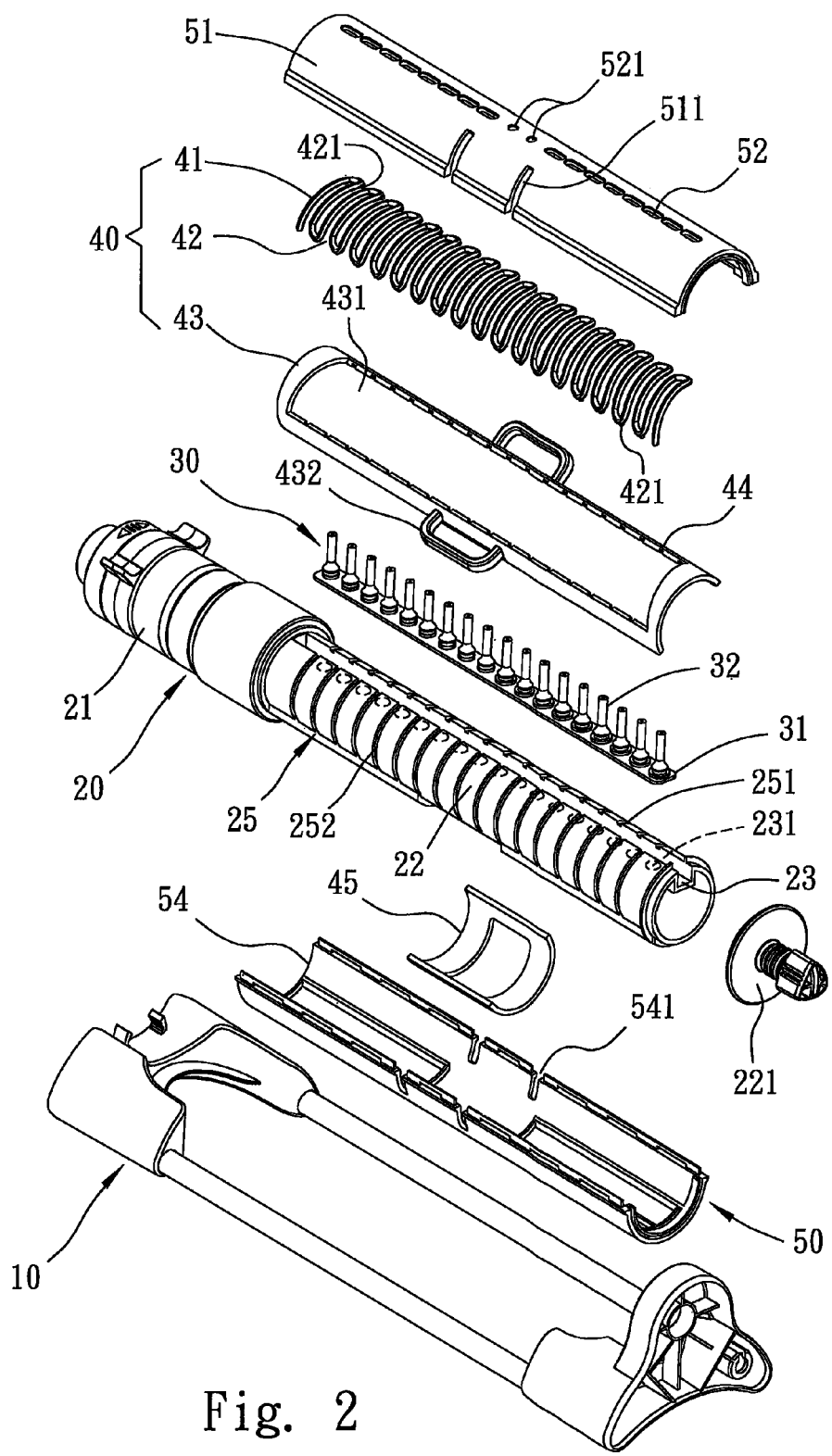
FIG. 2 is an exploded view of the oscillating sprinkler of the present invention.
Figure 3:
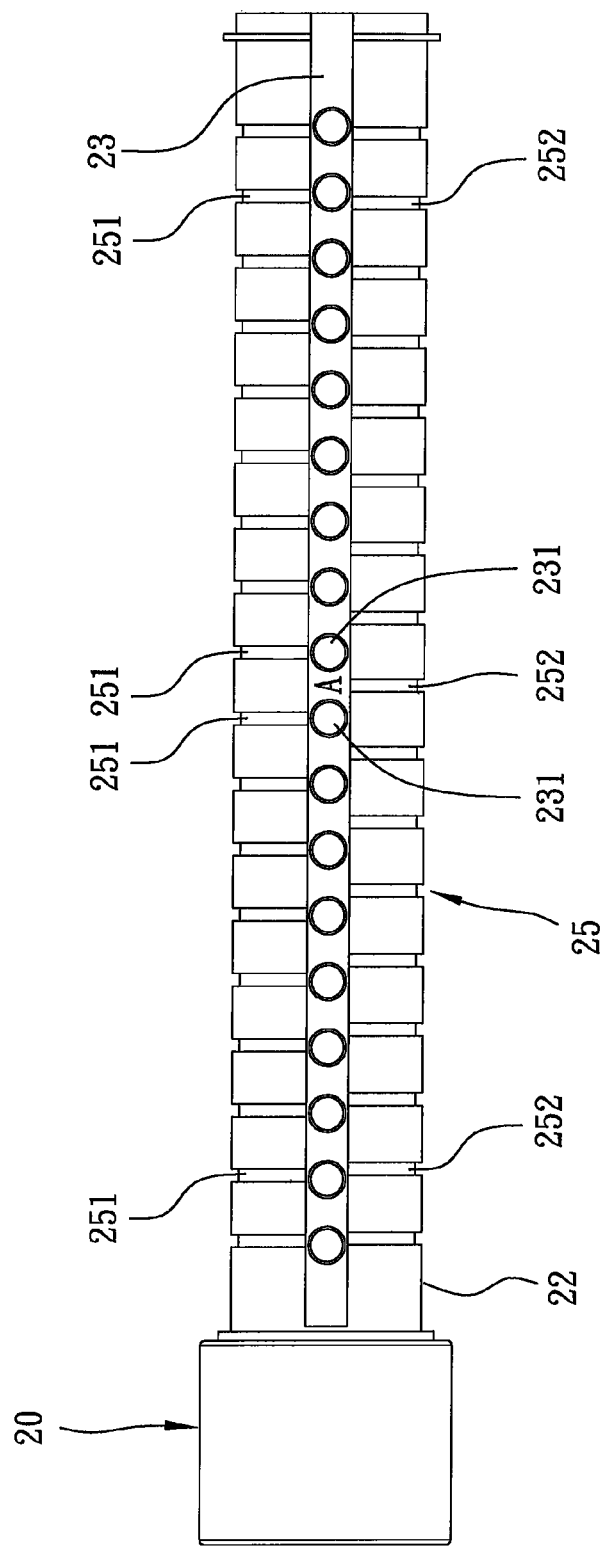
FIG. 3 is a top view to show the holes in the groove of the oscillation unit.

Referring to FIGS. 1 to 3, the oscillating sprinkler of the present invention comprises a base 10 to which an oscillating unit 20 is connected, and a nozzle unit 30. The oscillating unit 20 is connected between two ends of the bases 10. A control head 21 is connected to the first end of the oscillating unit 20, and an end cap 221 is connected to the second end of the oscillating unit 20. Water is introduced into the hollow tube 22 of the oscillating unit 20 from the first end of the hollow tube 22. The hollow tube 22 has a groove 23 defined axially in the outside or top thereof. The nozzle unit 30 is located in the groove 23 and has multiple flexible nozzles 32. Multiple holes 231 are defined through the inner bottom of the groove 23 and located corresponding to the nozzles 32. The holes 231 communicate with the interior of the hollow tube 22. The nozzles 32 extend through the holes 21 respectively, so that the water passes through the hollow tube 22 and ejects from the nozzles 32 when in use. The nozzle unit 30 has a plate 31 which is made by flexible rubber, and the nozzles 32 are evenly separated and connected to the plate 31. The nozzles 32 are made by flexible rubber and protrude out from the hollow tube 22.

As shown in FIGS. 2 and 3, the hollow tube 22 has multiple combination paths 25 defined radially in the outside thereof. Specifically, the combination paths 25 comprises first paths 251 and second paths 252, and the groove 23 is located between the first paths 251 and the second paths 252. The distance between any two adjacent first paths 251 is the same, and the distance between any two adjacent second paths 252 is the same. The distance between any two of the adjacent first paths 251 is smaller than the distance between any two of the adjacent second paths 252. In this embodiment, as shown in FIG. 3, taken a point "A" as a standard point which is located at the middle of the hollow tube 22. The point "A" is located corresponding to one of the second paths 252, and the point "A" is located between the two adjacent first paths 251. The distance between the corresponding second path 252 and the first path 251, like the second path 252 aiming the point "A" and the two first paths 251 located on two sides of the point "A", becomes gradually reduced toward each of the first end and the second end of the hollow tube 22. In other words, the second paths 252 are gradually located closer to the axes of the holes 231 toward each of the first end and the second end of the hollow tube 22. The distance between each of the second paths 252 and the axis of the hole 231 corresponding thereto reduces toward each of the first end and the second end of the hollow tube 22.

Figure 4:
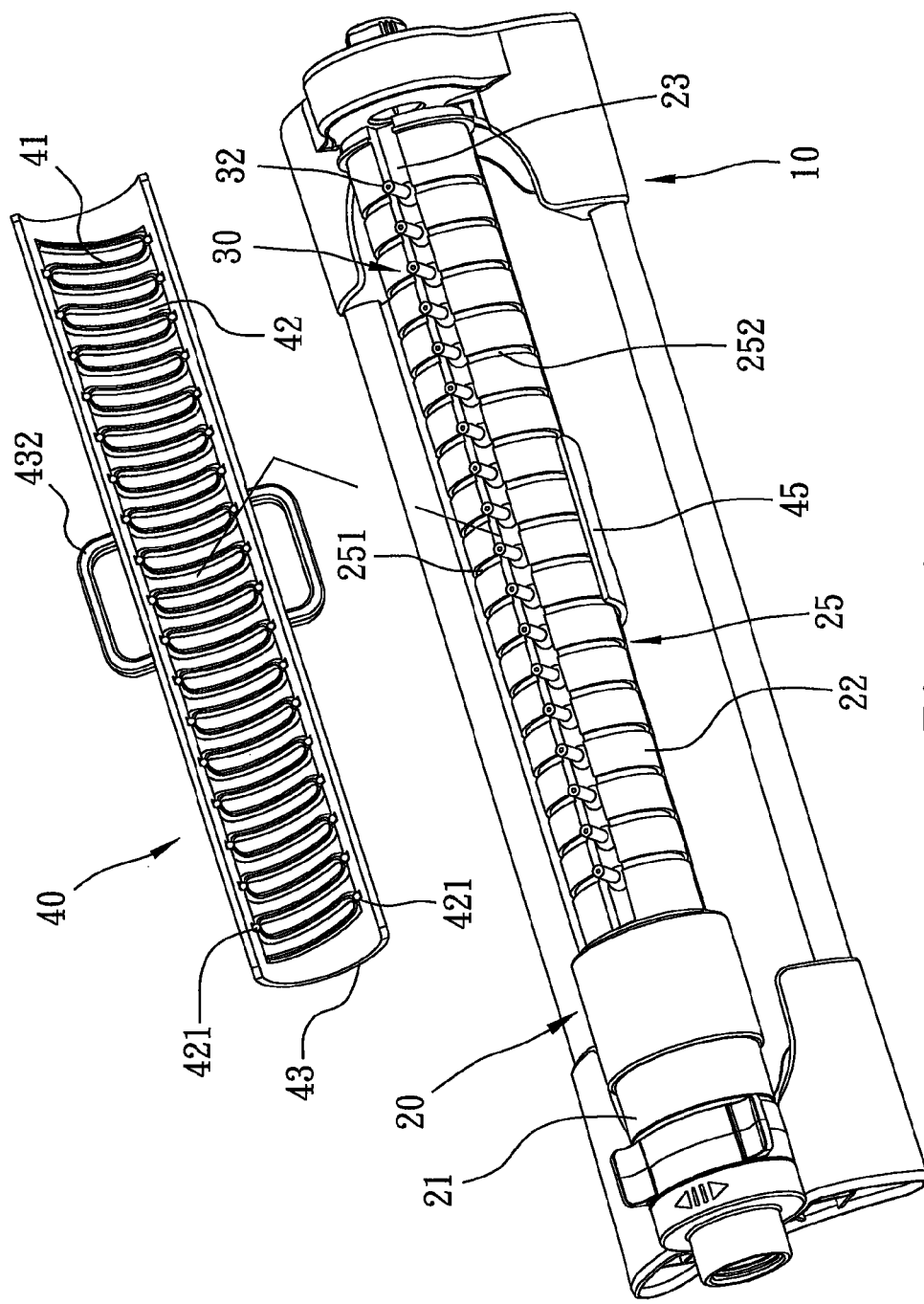
FIG. 4 is an exploded view of the oscillation unit and the driving unit of the oscillating sprinkler of the present invention.

Further referring to FIG. 4, a driving unit 40 has a resilient wire 41, a top member 43 and a bottom member 45. The top member 43 is a semi-circular and curved frame and an opening 431 is defined in the frame. The opening 431 is defined by two long sides and two short sides. Each of the two long sides has multiple notches 44 defined in the inside thereof. The bottom member 45 is a semi-circular and curved member which is connected to the top member 43 to form a tubular space in which the hollow tube 22 is received. The resilient wire 41 has a round cross section and is bent into continuous S-shaped portions. Each S-shaped portion has two adjustment slots 42 which are curved slots and open toward opposite directions. Each adjustment slot 42 is defined by an end portion 421 and two extensions extending from two ends of the end portion 421. The adjustment slots 42 each have the same width, and the inclination angle of the adjustment slots 42, relative to the axis of the resilient wire 41, gradually reduces toward each of two ends of the resilient wire 41. The resilient wire 41 is located in the opening 431 of the top member 43 and the end portions 421 are engaged with the notches 44 of the top member 43. The top member 43 has two handles 432 protruding from two outside of the two long sides thereof. The end portions 421 are movably located in the combination paths 25, and the nozzles 32 located in the adjustment slots 42 respectively.

Figure 5:
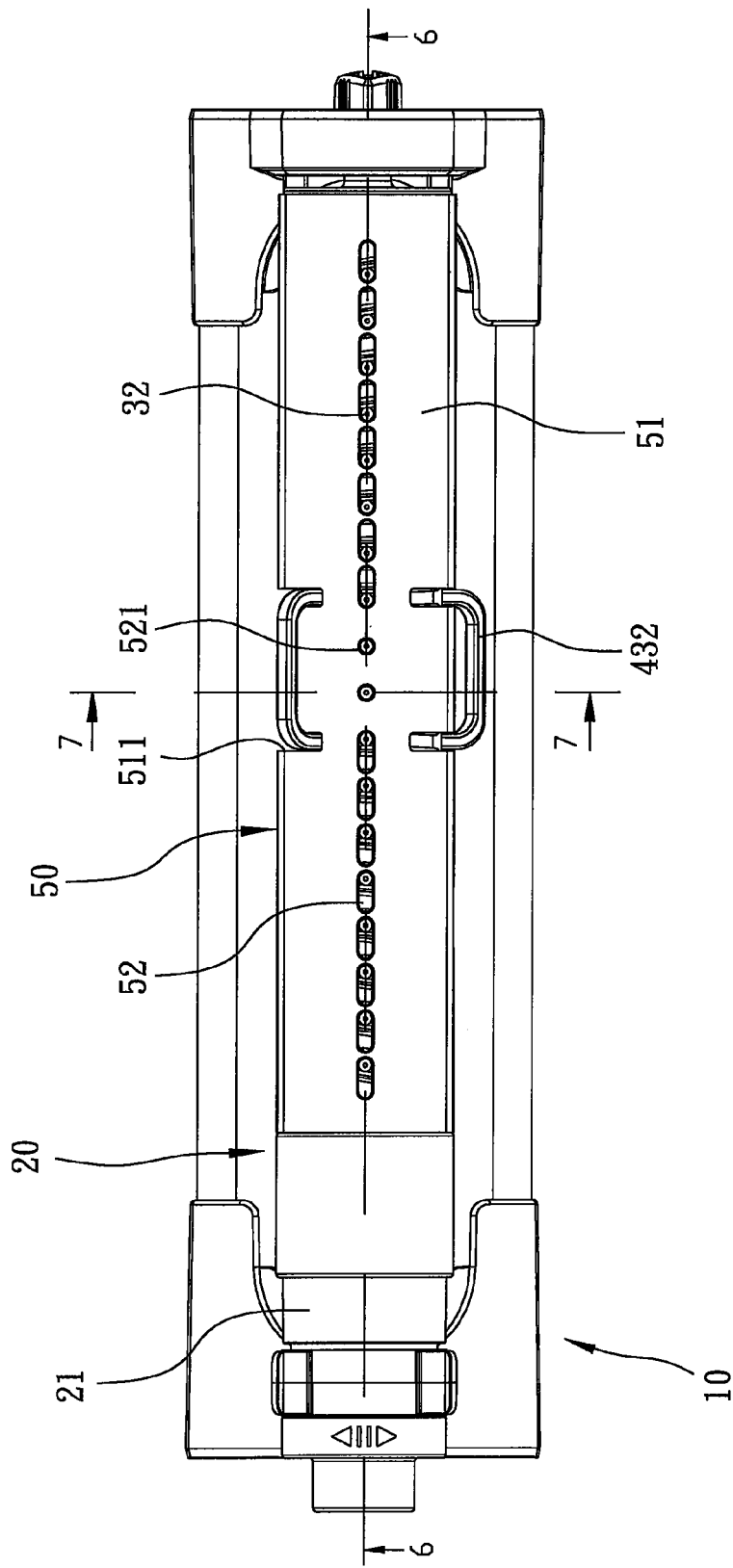
FIG. 5 is a top view to show the oscillating sprinkler of the present invention.
Figure 6:
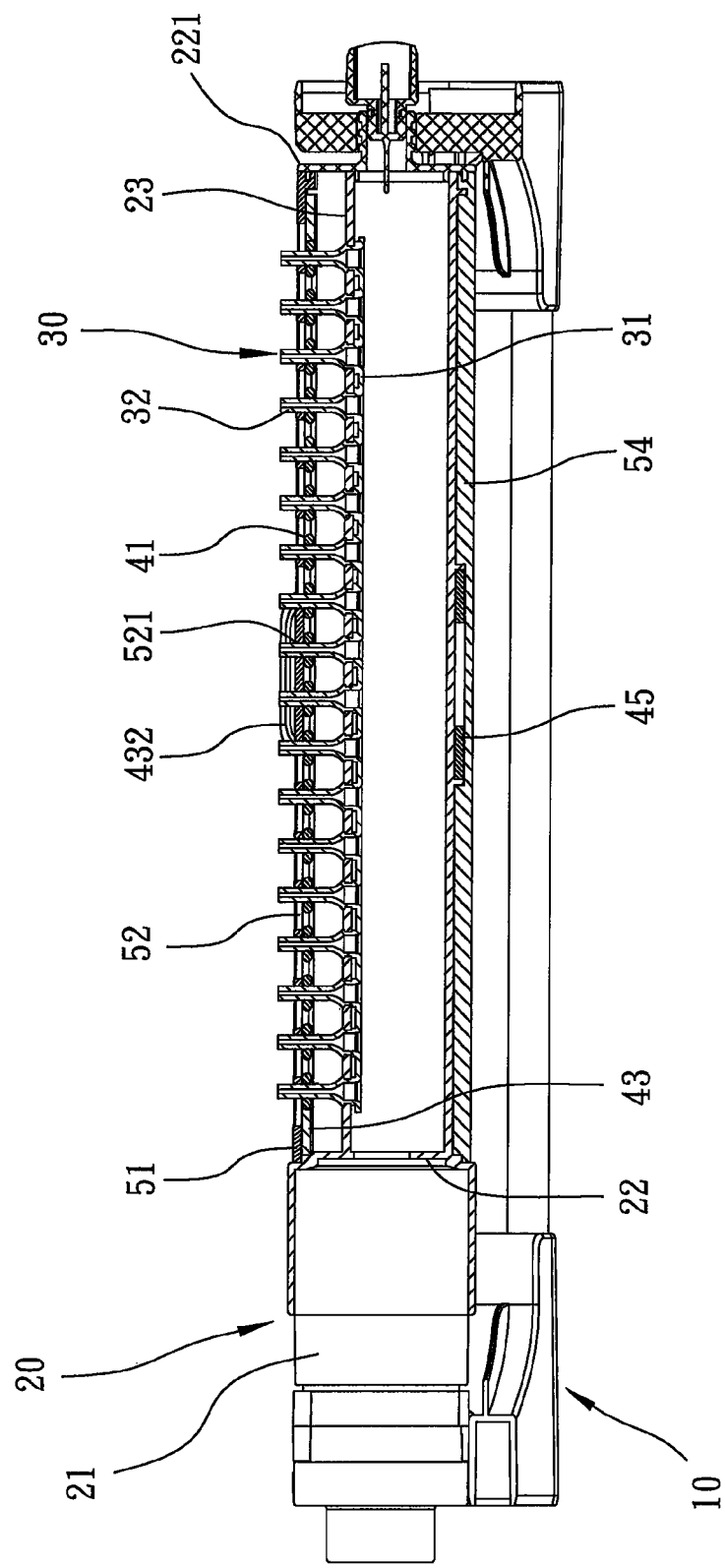
FIG. 6 is a cross sectional view, taken along line 6-6 in FIG. 5.

As shown in FIGS. 5, 6 and 7, the driving unit 40 has a housing 50 which has a top cover 51 and a bottom cover 54 which is connected to the top cover 51. The driving unit 40 is located between the top and bottom covers 51, 54. The top cover 51 has two first slots 511 in each of the two sides thereof, and the bottom cover 54 has two second slots 541 in each of the two sides thereof. The second slots 541 are located corresponding to the first slots 511. The handles 432 each are a U-shaped handle, and movably extend through the first and second slots 511, 541. The top cover 51 has two circular first apertures 521 and multiple elongate second apertures 52 defined in the central portion along the axial direction thereof. The first apertures 521 are located between two groups of the second apertures 52. The nozzles 32 extend through the first and second apertures 521, 52. The elongate second apertures 52 allow the nozzles 32 to be inclined. The two adjustment slots 42 that are located corresponding to the two first apertures 521 are substantially perpendicular to the axis of the resilient wire 41. When the resilient wire 41 moves along the first and second paths 251, 252, the inclination of the adjustment slots 42 will push the flexible nozzles 32 as shown in FIG. 8 to change the orientation of the nozzles 32 to sprinkle different areas.

Figure 9:
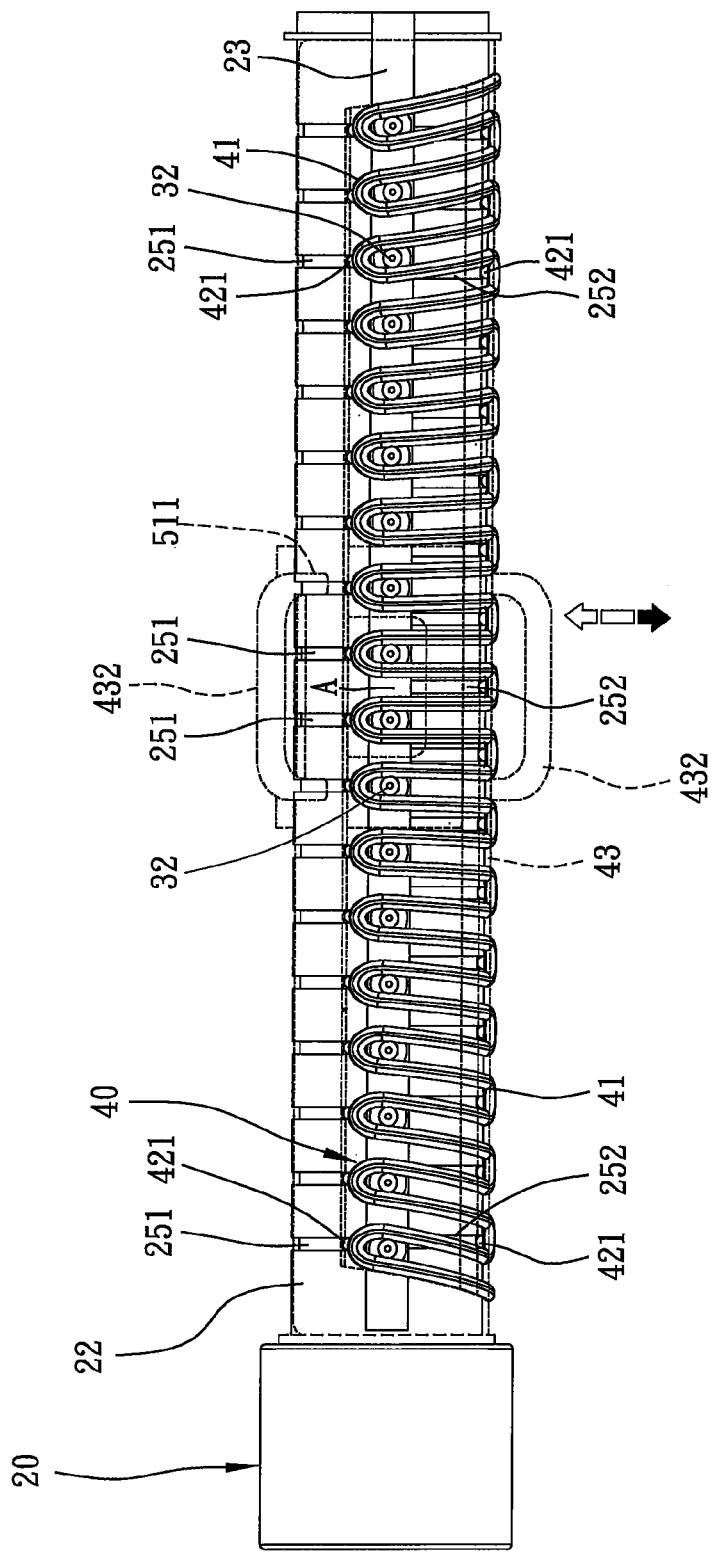
FIG. 9 shows a top view of the movement of the resilient wire of the first sprinkling type.
Figure 10:
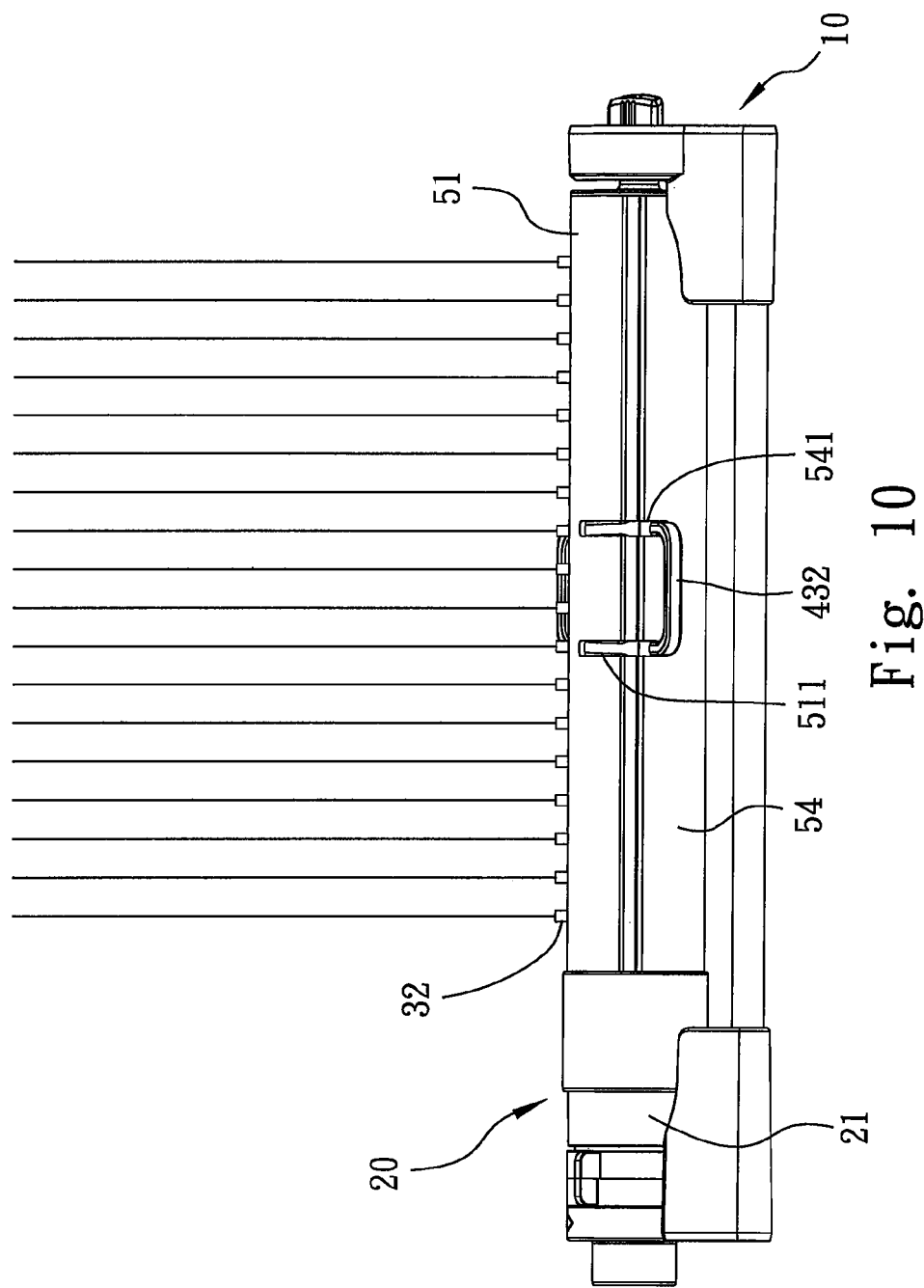
FIG. 10 shows a front view to show the first sprinkling type.

As shown in FIGS. 9 and 10, when in use, the user moves the handle 432 on the top cover 51 downward and into the second slots 541 of the bottom cover 54, the end portions 421 on the top of the resilient wire 41 in FIG. 9 move in the first paths 251 and close to the nozzles 32. The end portions 421 on the bottom of the resilient wire 41 in FIG. 9 move along the second paths 252 and away from the nozzles 32. At this position, the nozzles 32 are located within the width of the adjustment slots 42 so that the nozzles 32 are not pushed by the resilient wire 41, and the nozzles 32 are still oriented upright, the water sprays straight as shown in FIG. 10.

Figure 11:
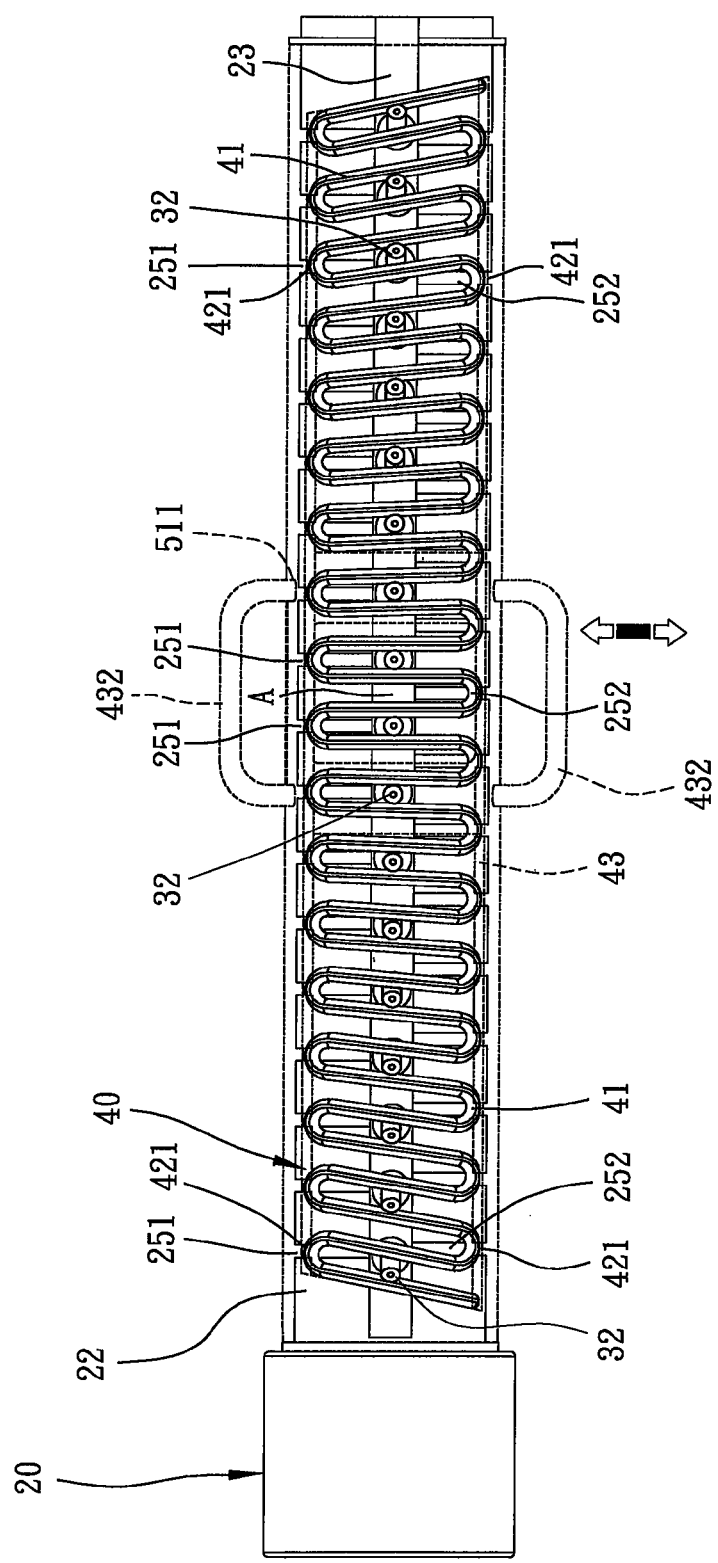
FIG. 11 shows a top view of the movement of the resilient wire of the second sprinkling type.
Figure 12:
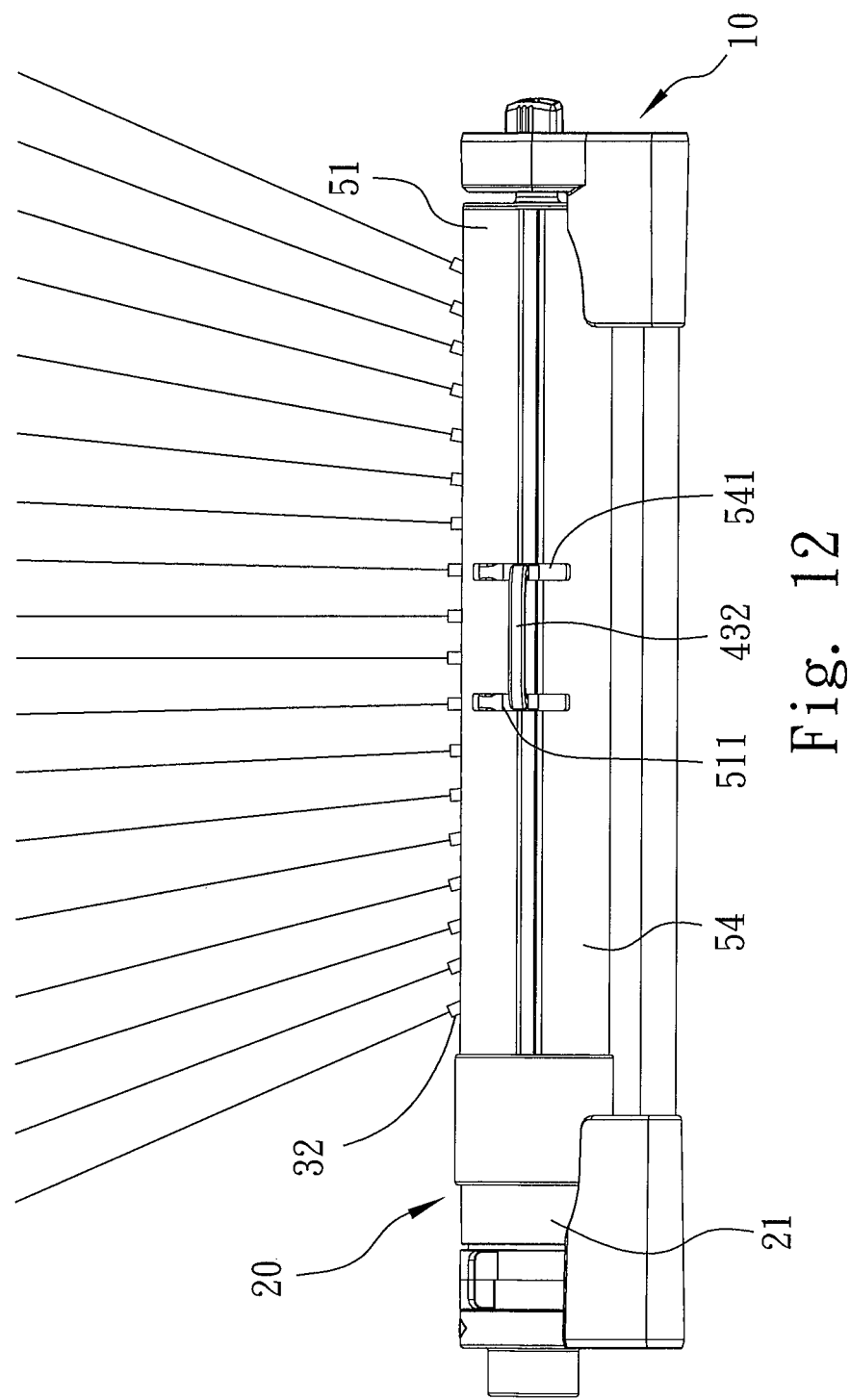
FIG. 12 shows a front view to show the second sprinkling type.

As shown in FIGS. 11 and 12, when the user moves the handle 432 on the top cover 51 upward and position the handle 432 at the middle/central position between the first and second slots 511, 541. The nozzles 32 are now located at a middle position between the end portions 421 on the top of the resilient wire 41 and on the bottom of the resilient wire 41 as shown in FIG. 11. Because the inclination angle of the adjustment slots 42, relative to the axis of the resilient wire 41, gradually reduces toward each of two ends of the resilient wire 41, the nozzles 32 in the elongate first apertures 521 are pushed and tilt so that the water sprays to a smaller fan-shaped area as shown in FIG. 12.

Figure 13:
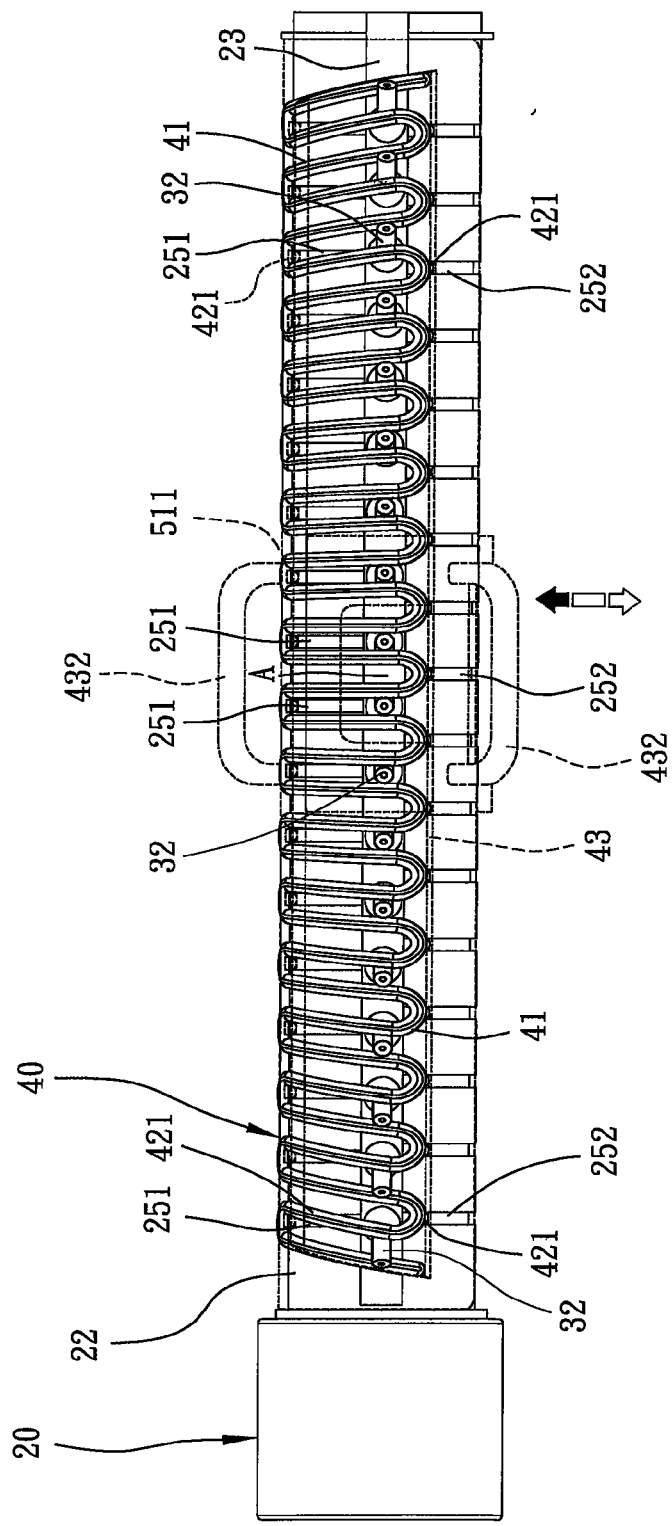
FIG. 13 shows a top view of the movement of the resilient wire of the third sprinkling type.

As shown in FIGS. 13 and 14, when the user moves the handle 432 on the top cover 51 further upward, the end portions 421 on the top of the resilient wire 41 move in the first paths 251 and away from the nozzles 32. The end portions 421 on the bottom of the resilient wire 41 move along the second paths 252 and close to the nozzles 32. Because the second paths 252 are gradually located closer to the axes of the holes 231 toward each of the first end and the second end of the hollow tube 22, the and the inclination of the adjustment slots 42 becomes larger toward each of the two ends of the resilient wire 41, the nozzles 32 in the elongate second apertures 52 will be pushed even tilt so that a lager and wider fan-shaped area can be sprinkled as shown in FIG. 14.

While we have shown and described the embodiment in accordance with the present invention, it should be clear to those skilled in the art that further embodiments may be made without departing from the scope of the present invention.

What is claimed is:

1. An oscillating sprinkler comprising: a base, an oscillating unit and a nozzle unit, the oscillating unit connected between two ends of the base and having a hollow tube which has a groove defined axially in an outside thereof, the nozzle unit located in the groove and having multiple flexible nozzles, multiple holes defined through an inner bottom of the groove and located corresponding to the nozzles, the holes communicating with an interior of the hollow tube, the nozzles extending through the holes respectively; the hollow tube having multiple combination paths defined radially in the outside thereof, the combination paths comprising first paths and second paths, the groove located between the first paths and the second paths, a distance between any two adjacent first paths being the same, a distance between any two adjacent second paths being the same, the distance between any two of the adjacent first paths being smaller than the distance between any two of the adjacent second paths, and a driving unit having a resilient wire, a top member and a bottom member, the top member having an opening which is defined by two long sides and two short sides, each of the two long sides having multiple notches defined in an inside thereof, the hollow tube being located between the top member and the bottom member, the resilient wire having a round cross section and being bent into continuous S-shaped portions, each S-shaped portion having two adjustment slots which are curved slots and open toward opposite directions, each adjustment slot being defined by an end portion and two extensions extending from two ends of the end portion, the resilient wire located in the opening of the top member and the end portions being engaged with the notches of the top member, the end portions movably located in the combination paths, the nozzles located in the adjustment slots respectively.

2. The oscillating sprinkler as claimed in claim 1, wherein the first paths each are located corresponding to an axis of the hole corresponding thereto, the axis of each of the holes is located between the two adjacent second paths corresponding thereto.

3. The oscillating sprinkler as claimed in claim 2, wherein a distance between each of the second paths and the axis of the hole corresponding thereto reduces toward each of the first end and the second end of the hollow tube.

4. The oscillating sprinkler as claimed in claim 1, wherein the top member is a semi-circular and curved frame in which the opening is defined, the top member has two handles protruding from two outside of the two long sides thereof, the bottom member is a semi-circular and curved member which is connected to the top member to form a tubular space in which the hollow tube is received.

5. The oscillating sprinkler as claimed in claim 4, wherein the driving unit has a housing which has a top cover and a bottom cover which is connected to the top cover, the driving unit is located between the top and bottom covers, the top cover has first slots and the bottom cover has second slots which are located corresponding to the first slots, the handles are movably extending through the first and second slots, the top cover has multiple circular first apertures and elongate second apertures defined in a central portion thereof, the first apertures are located between two groups of the second apertures, the nozzles extend through the first and second apertures.

6. The oscillating sprinkler as claimed in claim 1, wherein an inclination angle of the adjustment slots, relative to an axis of the resilient wire, reduces toward each of two ends of the resilient wire.

\* \* \* \* \*